United States Patent
Kumar et al.

(10) Patent No.: US 11,227,089 B2
(45) Date of Patent: Jan. 18, 2022

(54) SYSTEM AND METHOD FOR IMPLEMENTING FUNCTIONAL LOGICS OF VERIFICATION IP USING STATE DESIGN PATTERN BASED FSMS

(71) Applicant: SILICONCH SYSTEMS PVT LTD, Karnataka (IN)

(72) Inventors: Kaustubh Kumar, Bengaluru (IN); Pavitra Balasubramanian, Bengaluru (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 349 days.

(21) Appl. No.: 16/370,615

(22) Filed: Mar. 29, 2019

(65) Prior Publication Data
US 2020/0311216 A1    Oct. 1, 2020

(51) Int. Cl.
*G06F 30/3323* (2020.01)
*G06Q 50/18* (2012.01)

(52) U.S. Cl.
CPC ....... *G06F 30/3323* (2020.01); *G06Q 50/184* (2013.01)

(58) Field of Classification Search
CPC ............. G06F 30/3308; G06F 30/3323; G06F 2115/08; G06Q 50/184; G01R 31/31724; G05B 19/045; G11C 29/16
See application file for complete search history.

(56) References Cited

PUBLICATIONS

Universal Serial Bus Type-C Cable and Connector Specification Release 2.0, USB 3.0 Promoter Group, Aug. 2019 (373 pages).
Universal Serial Bus Power Delivery Specification, Revision 3.0, Version 2.0, Aug. 29, 2019 (657 pages).

*Primary Examiner* — Jack Chiang
*Assistant Examiner* — Aric Lin
(74) *Attorney, Agent, or Firm* — Procopio, Cory, Hargreaves & Savitch LLP

(57) ABSTRACT

A system for implementing functional logics of a verification IP using a transaction level modeling (TLM) is provided. The system includes (A) a stimulus generator to initiate a transaction and transmit the transaction through a transaction level model interface, (B) a verification IP unit to receive and process the transaction and (C) a signal-level driver to toggle pins of the design under test (DUT) based on the processed transaction. The verification IP unit is configured to (a) divide functional logics of a verification IP unit into one or more finite state machines (FSMs) when a transaction is received from a stimulus generator, (b) define a set of state variables for each of the one or more FSMs, (c) implement a state class for each state of the one or more FSMs and (d) modify the functionality of the one or more FSMs.

15 Claims, 12 Drawing Sheets

| FSM_WRAPPER_CLASS | |
|---|---|
| +M_STATE: <STATE_INTERFACE_CLASS> +M_STATE_VAR: <STATE_VARIABLE_CLASS> | +DO_ON (.....) <br> + DO_RUN (.....) <br> +DO_OFF (.....) <br> + DO_RESET (.....) <br> +DO_SUSPEND (.....) <br> +DO_RESUME (.....) <br> +DO_INTERRUPT (.....) <br> +PUT(.....) <br> +TRY_PUT (.....) <br> + GET (.....) <br> + TRY_GET (.....) |

SYSTEM AND METHOD FOR IMPLEMENTING FUNCTIONAL LOGICS OF VERIFICATION IP USING STATE DESIGN PATTERN BASED FSMS

BACKGROUND

Technical Field

The embodiments herein generally relate to a verification system, and, more particularly, to a system and method for implementing functional logics of verification IP using a transaction level modeling.

Description of the Related Art

A Verification Intellectual Property (VIP), in general, represents a unit, modeled behaviorally, to drive input signals into a Design Under Test (DUT) and verify the correctness of the output signals from DUT. VIPs used in functional verification of a DUT are mostly developed as Transaction Level Models (TLMs) in UVM/OVM. Hence, a VIP, for functionally verifying a protocol, contains processing of transaction(s) generated by a Testcase/Stimulus Generator, and eventually converting the encapsulating transaction(s) into DUT pin toggling. The functional logics of a Verification IP may scale from a simple Bus Functional Model (BFM) for signaling the DUT to a multi-layered protocol model for processing the transaction at each layer and eventually signaling the DUT.

Existing UVM/OVM methodologies cater to the Verification IP architecture requirements, only to a certain limit, by separating the uvm_driver/ovm_driver (the entity intended to implement the BFM/Verification IP) from the uvm_sequence/uvm_test/ovm_sequence/ovm_test (the entities intended to implement the Testcase/Stimulus Generator for the uvm_driver/ovm_driver). The entire functional logic shall be written inside the uvm_driver/ovm_driver. As a result, if the functionality of the Verification IP needs to be modified for a particular test/scenario, entire uvm_driver/ovm_driver need to be overridden in factory infrastructure provided by UVM/OVM methodologies. This implies increased redundancy of the code with an increase in complexity of the functional logic implemented in Verification IP.

Another existing method to achieve functionality modification or re-implementation of the existing functional logic is through callbacks. Callbacks are implemented as hierarchical hooks which can be implemented outside the functional logic. This method has the advantage of no code redundancy, but hits the performance because of the hierarchical access involved. Moreover, for scenarios where modification of a large functional logic is needed, multiple callbacks might be required which increasingly hit the performance. Though, similar architectures have been proposed for implementation of the functional logic of Verification IPs, none of architecture avoids redundancy and without compromising the performance of the Verification IPs.

Accordingly, there remains a need for system or method to architect the functional logic of Verification IP for efficient controllability, observability and modularity.

SUMMARY

In view of a foregoing, an embodiment herein provides a method for implementing functional logics of a verification IP using state design pattern based finite state machines (FSMs) communicating with each other thus implementing the functionality. The method includes the following steps of (a) dividing functional logics of a verification IP unit into one or more finite state machines which receive transaction from a stimulus, (b) defining a set of state variables for each of the one or more FSMs, (c) implementing a state class for each state of the one or more FSMs to (i) execute a functionality of a current state corresponding to the state class and (ii) determine a next state of the one or more FSMs based on one or more execution results of the current state, and (d) modifying the functionality of the one or more FSMs by (i) extending the state class to define a modified state class with a modified functionality in accordance with an erroneous functionality and (ii) over-riding the state class with the modified state class to introduce the erroneous functionality.

In one embodiment, the method further includes adding an additional functionality to the one or more FSMs by (i) extending the state class to define a modified state class with a modified functionality that is directed to a new state class with the additional functionality to be added, (ii) over-riding the state class with the modified state class and (iii) defining and adding the new state class with the next state class.

In another embodiment, the method further includes removing a functionality of the one or more FSMs by (i) extending the state class to define a modified state class with a modified functionality that is directed to a next state class after skipping a state class comprising the functionality to be removed, and (ii) over-riding the state class with the modified state class.

In one embodiment, the defining the set of state variables for each of the one or more FSMs includes (i) defining a state variable base class for determining the set of state variables for the one or more FSMs and (ii) defining the set of state variables that are specific to the one or more FSMs by extending the state variable base class.

In one embodiment, the implementing the state class for each state of the one or more FSMs includes (i) providing a state interface to expose the functionalities of the state class, (ii) defining a state base class for the baseline functionalities of the state class, (iii) implementing the state class of the one or more FSMs by extending the state class from the state base class and (iv) implementing a decision logic to determine a next state class.

In one embodiment, the execution of the functionality of the state class includes (a) switching ON the one or more FSMs by (i) identifying an initial state class of the one or more FSMs, (ii) executing the functionalities of the initial state class and (iii) determining a first next state class of the one or more FSMs; (b) running the one or more FSMs by (i) identifying the next state class as a new state class, (ii) executing the functionalities of the new state class and (iii) determining a second next state class of the one or more FSMs; and (c) switching OFF the one or more FSMs by terminating the execution of the state class.

In another embodiment, the execution of the functionality of the state class further includes (i) resetting the one or more FSMs by switching OFF the one or more FSMs and switching ON the one or more FSMs, (ii) suspending execution of the one or more FSMs at a current state class on generation of an interrupt, (iii) resuming the execution of the one or more FSMs from the current state class, and (iv) interrupting the execution of the one or more FSMs on generation of the interrupt.

In another embodiment, the execution of the functionality of the state class further includes (i) defining an interrupt service routine (ISR) state of the interrupt resulting in (a) suspending the execution of the one or more FSMs and resuming after executing the ISR state, and (ii) interrupting the execution of the one or more FSMs and returning to the initial state class of the one or more FSMs after executing the ISR state.

In another embodiment, the execution of the functionality of the state class further includes: (i) transmitting the transaction to another FSM; and (ii) receiving the transaction from another FSM.

In yet another embodiment, the method further includes the step of providing a communication interface for transmitting the transaction from at least one of (i) a source FSM to a destination FSM, (ii) the stimulus generator to the one or more FSMs, (iii) the one or more FSMs to a signal level driver, and (iv) a source component to a destination component.

In one embodiment, the method further includes (i) connecting the source FSM or component to the destination FSM/component through a database that includes transaction level queues, (ii) resetting the transaction level queues in the database, (iii) storing, in the database, a transaction from the source FSM/component to the destination FSM/component, (iv) retrieving, from the database, a transaction for the destination FSM/component from any connected source FSM/component, (v) broadcasting, from the database, a transaction for all the connected destination FSMs/components from the source FSM/component, and (vi) removing, from the database, at least one of (a) all transactions pending to be received by the destination FSM/component, and (b) all transactions transmitted by the source FSM/component.

In yet another embodiment, the method further includes (i) retrieving a list of source FSMs/components with transaction pending to be transmitted to a connected destination FSM/component; and (ii) retrieving a number of pending transactions in the transaction level queue for a particular pair of the source FSM/component and the destination FSM/component In one aspect, a verification system for implementing functional logics of a verification IP using a transaction level modeling (TLM) is provided. The system includes (A) a stimulus generator that is configured to initiate a transaction and transmit the transaction through a transaction level model interface, (B) a verification IP unit that is configured to receive and process the transaction, wherein the functional logic of the verification IP unit is divided into one or more finite state machines (FSMs), wherein the one or more FSMs is configured to (i) define a set of state variables for each of the one or more FSMs; (ii) implement a state class for each state of the one or more FSMs to execute a functionality of a current state corresponding to the state class and to determine a next state of the one or more FSMs based on one or more execution results of the current state, (iii) modify the functionality of the one or more FSMs by (a) extending the state class to define a modified state class with a modified functionality in accordance with an erroneous functionality, and (b) over-riding the state class with the modified state class to introduce the erroneous functionality for error testing of a design under test, and (C) a signal-level driver that is configured to toggle pins of the design under test (DUT) based on the processed transaction.

In one embodiment, the one or more FSMs is further configured to add an additional functionality to the one or more FSMs by (i) extending the state class to define a modified state class with a modified functionality that is directed to a new state class with the additional functionality to be added, (ii) over-riding the state class with the modified state class, and (iii) defining and adding the new state class with the next state class.

In one embodiment, the one or more FSMs is further configured to remove a functionality of the one or more FSMs by (i) extending the state class to define a modified state class with a modified functionality that is directed to a next state class after skipping a state class comprising the functionality to be removed, and (ii) over-riding the state class with the modified state class.

This architecture of the functional logic of the Verification IP of the present invention provides a control over the operations of the Verification IP, as demanded by the various scenarios needed for testing the DUT. The FSM states may be modified to change the functional operation of the state. As each state of a FSM is eventually a class, the state class may be overridden by another desired state class without modifying an original base class. An addition of a new state to the FSM, or a deletion of an existing state may be performed without modifying an original implementation of the Verification IP which is purpose of this architecture. The present method and system of architecting the verification IP using State Classes and Finite State Machines provides improved controllability, modularity and observability of the Verification IP. The present method may reduce code redundancy as the code for functional model is divided into multiple states over multiple FSMs. Hence, if a state is overridden for error injection, the modified implementation for that state only needs to be written.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 illustrates an exemplary view of a FSM wrapper class according to an embodiment herein;

DETAILED DESCRIPTION OF PREFERRED EMBODIMENTS

Figure 1:
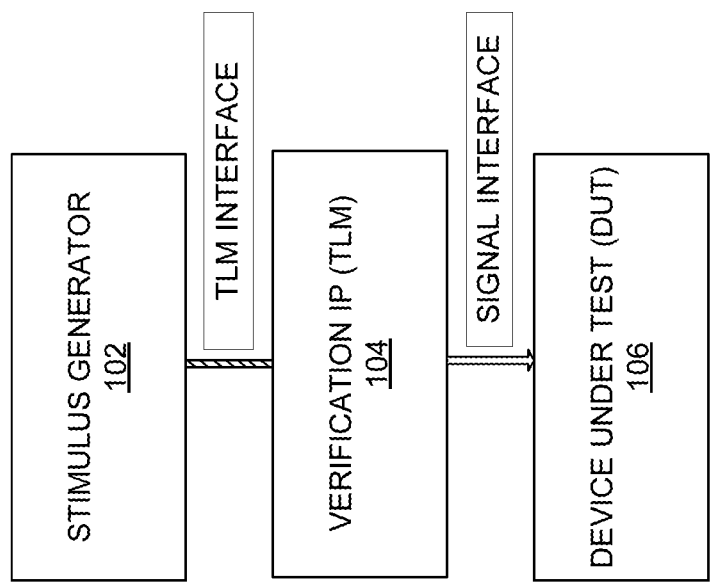
FIG. 1 illustrates a system view of a verification system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need of a system and a method for architecting the functional logics of Verification IP (VIP) to enable more controllability, observability and modularity of the Verification IP unit. The embodiments herein achieve this by providing an architecture of functional logic of a VIP. The architecture of the verification IP unit includes one or more Finite State Machines (FSMs) communicating with each other to implement functionality of VIP. Referring now to the drawings, and more particularly to FIGS. 1 through 12, where similar reference characters denote corresponding features consistently throughout the figures, there are shown preferred embodiments.

FIG. 1 illustrates a system view of a verification system according to an embodiment herein. The verification system includes a stimulus generator 102, a verification IP unit 104 and a design under test (DUT) unit 106. The stimulus generator 102 is configured to initiate a transaction and transmit the transaction through a transaction level model interface. The verification IP unit 104 is configured to receive and process the transaction in the design under test (DUT) 106. The verification IP unit 104 processes the transaction and verifies the correctness of the output of the transaction. Thus, the verification IP unit 104 that is controlled by the stimulus generator 102 processes the transaction generated by stimulus generator 102 and signaling the DUT 106.

In one embodiment, an architecture of verification IP unit 104 is implemented for functional verification of a layered protocol. In another embodiment, an architecture of verification IP unit 104 is implemented for functional verification of a non-layered protocol. In one embodiment, the DUT is a hardware design or a module of a layered or a non-layered protocol.

Figure 2:
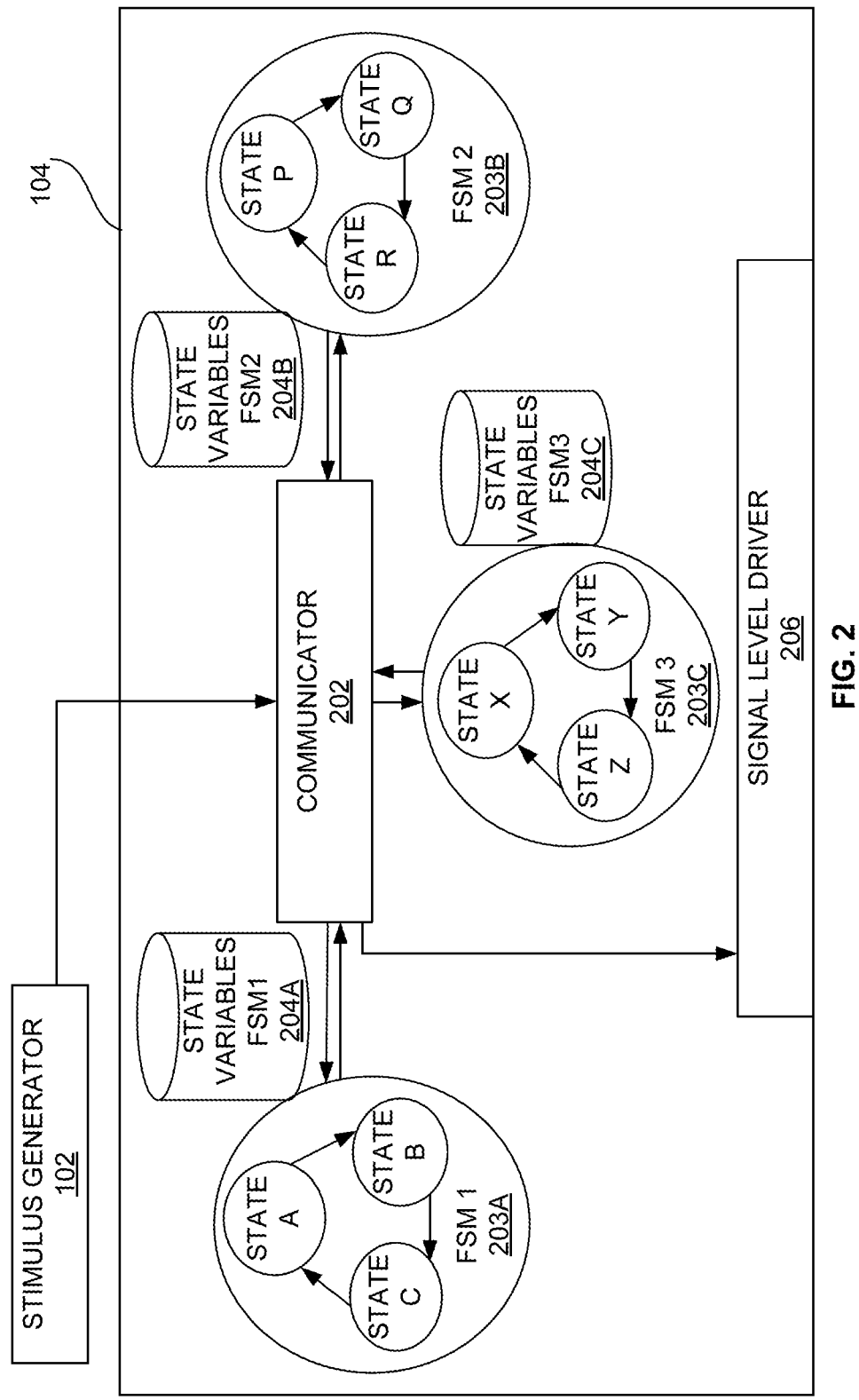
FIG. 2 illustrates a functional architecture of a verification IP unit of verification system of FIG. 1 according to an embodiment herein.

FIG. 2 illustrates a functional architecture of the verification IP unit 104 of verification system of FIG. 1 according to an embodiment herein. The functional logics of the verification IP unit 104 are divided into one or more finite state machines (FSM's) (e.g. a FSM1 203A, a FSM2 203B, and a FSM3 203C) when the transaction is received from the stimulus generator 102. The functional architecture of the verification IP unit 104 includes a communicator 202, FSM1 203 A, FSM2 203B, FSM3 203C and the signal level driver 206. Each of the one or more FSM's 203A-C includes a state variables definition module, a state class implementation module and an error injection routine module. The state variables definition module defines a set of state variables 204A-C for each of the one or more FSMs 203A-C. The set of state variables 204A-C maintain their value throughout the transaction processing and are encapsulated in a class. In one embodiment, the FSM1 203A includes a set of state variables for state A, state B and state C. Similarly, the FSM2 203B includes a set of state variables for state P, state Q and state R. Similarly, the FSM3 203C has a set of state variables for state X, state Y and state Z. The state class implementation module implements a state class for each state of the one or more FSMs to (a) execute a functionality of a current state corresponding to the state class and (b) determine a next state of the one or more FSMs 203A-C based on one or more execution results of the current state. In one embodiment, each state of the one or more FSMs 203A-C is represented as the state class. The error injection routine module modifies a functionality of the one or more FSMs 203A-C by (a) extending the state class to define a modified state class with a modified functionality in accordance with an erroneous functionality, and (b) over-riding the state class with the modified state class to introduce the erroneous functionality. In one embodiment, an error injection routine introduces an error in the transaction to verify the DUT by the verification IP UNIT 104 or to identify a malfunction in the DUT when executing the functional logics of the one or more FSM's during transaction processing.

In one embodiment, each of the one or more FSM's 203A-C of the verification IP unit 104 further includes a functionality addition module. The functionality addition module adds an additional or new functionality to the one or more FSM's 203A-C by (a) extending the state class to define a modified state class with a modified functionality that is directed to a new state class with the additional functionality to be added, (b) over-riding the state class with the modified state class and (c) defining and adding the new state class with the next state class.

In one embodiment, each of the one or more FSM's 203A-C of the verification IP unit 104 further includes a functionality removal module. The functionality removal module removes the functionality of the one or more FSMs 203A-C by (a) extending the state class to define a modified state class with a modified functionality that is directed to a next state class after skipping a state class comprising the functionality to be removed, and (b) over-riding the state class with the modified state class.

Figure 3:
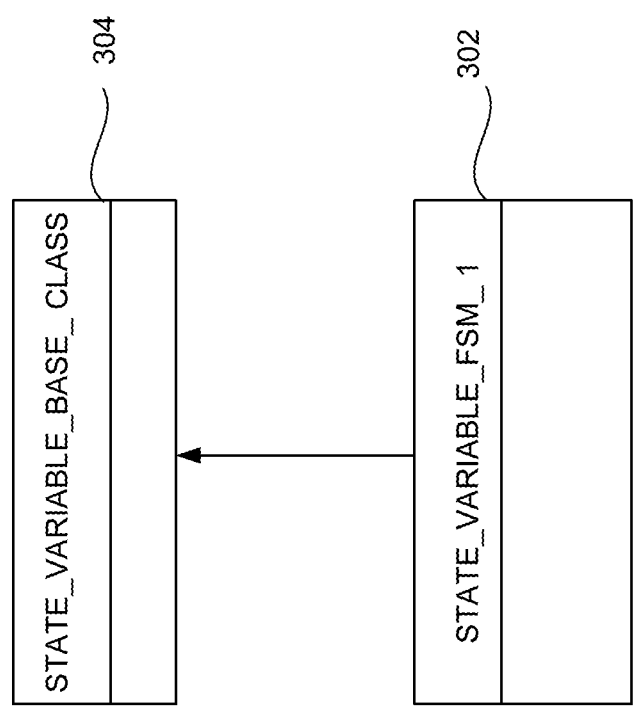
FIG. 3 illustrates an exemplary method of creating a state variable class according to an embodiment herein.

FIG. 3 illustrates an exemplary method of creating a state variable class according to an embodiment herein. The exemplary method of defining a set of state variables 204A for FSM1 203A includes the following steps. At step 302, State_Variable_Base_Class is declared. At step 304, the State_Variable_Base_Class is extended by State_Variable_FSM_1 203 A to define the set of state variables 204A that are specific to the FSM1 203 A.

Figure 4:
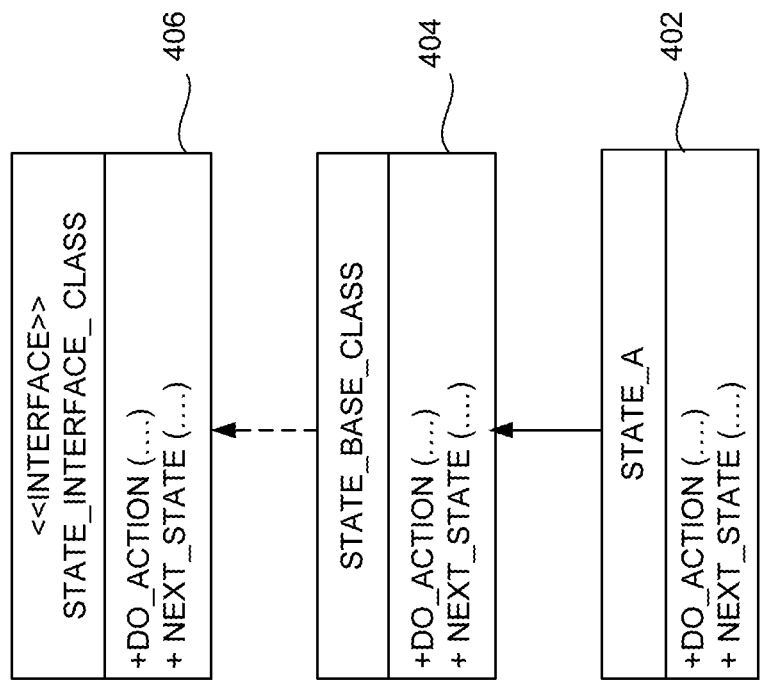
FIG. 4 illustrates an exemplary method of creating a state class according to an embodiment herein.

FIG. 4 illustrates an exemplary method of creating the state class according to an embodiment herein. The exemplary method of creating a state class for each state of the FSM 1 203A includes the following steps. At step 402, a virtual interface class, State_Interface_Class, is defined to expose interface for state level operations. A State_Base_ Class implements the baseline features for state level operations exposed by State_Interface_Class. At step 404, a State_A Class is extended from State_Base_Class. At step 406, the extended State implements detailed operations specific to State A of FSM1 203 A.

FIG. 5 illustrates an exemplary view 502 of a FSM wrapper class according to an embodiment herein. The FSM Wrapper Class declares (a) m_state_object_handle of the State_Interface_Class, and (b) m_state_var_object_handle of the FSM specific State_Variable_Class. In an example embodiment, the FSM Wrapper Class wraps one or more state classes. The one or more functions of FSM wrapper class includes (i) a "do_on" function to switch ON the FSM1 203A, (ii) a "do run" to RUN the FSM1 203A, (iii) a "do_off" function to switch OFF the FSM1 203A, (iv) a "do_reset" function to RESET the FSM1 203A, (v) a "do_suspend" function to suspend the execution of the FSM1 203A at the current state, (vi) a "do_resume" function to resume the execution of the FSM 1 203A from the state it was suspended at, (vii) a "do interrupt" function, (viii) a "put" function or a "try_put" function to transmit the transaction to another FSM2 203B in blocking or non-blocking manner over the communicator 202, (ix) a "get" function or "try_get" function to receive the transaction from another FSM3 203C in blocking or non-blocking manner over the communicator 202.

In one embodiment, the "do_on" function to switch ON the FSM 1 203A is performed by (a) making m_state to point to the initial State_Class, (b) invoking the do_action routine of the initial State_Class to execute the operations of the initial FSM state and (c) invoking the next state routine of the initial State_Class to evaluate the next state of the FSM1 203A. In one embodiment, the "do run" function to RUN the FSM 1 203A is performed by (a) making m_state to point to the current State_Class, (b) invoking the do_action function of the current State_Class to execute the operations of the current FSM state and (c) invoking the next state function of the current State Class to evaluate the next state of the FSM1 203A and (d) repeating the above steps to continue running the FSM 1 for as many number of repetitions as desired. In one embodiment, the "do_off" function to switch OFF the FSM1 203A is performed by terminating execution of the currently running do_action task of the current State_Class. In one embodiment, the "do_reset" function RESET the FSM1 203A by internally calling the "do_off" function and then the "do_on" function. In one embodiment, the "do interrupt" function to execute the FSM1 is performed by at least one of (i) interrupt the execution of the FSM 1 203A by (a) the m_state to execute a special State_Class with "do_action" function defines a Interrupt Service Routine (ISR) of the interrupt generated, and (b) return to the initial state of the FSM 1 203A, or (ii) suspend the execution of the FSM 1 203A at the current state by (a) the m_state to execute the special State_Class handle with "do_action" function defines the ISR of the interrupt generated and (b) return to the previous execution point of the FSM 1 203A.

Figure 6:
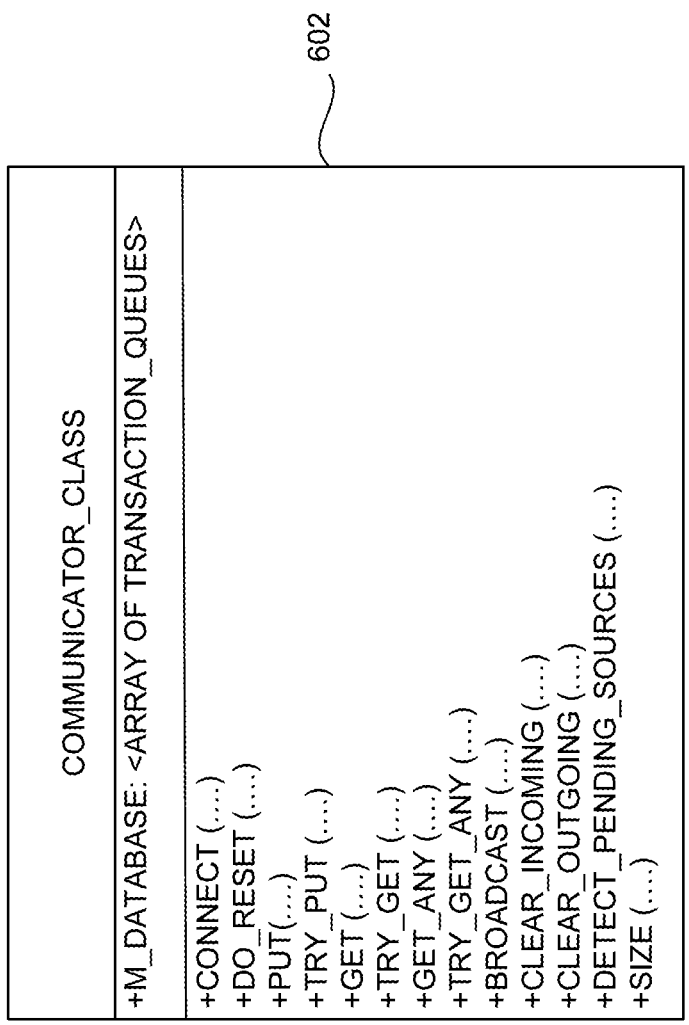
FIG. 6 illustrates an exemplary view of a communicator class according to an embodiment herein.

FIG. 6 illustrates an exemplary view 602 of a communicator class according to an embodiment herein. The communicator class provides a communication interface for transferring transactions between one or more FSMs 203A-C as well as between FSM of the verification IP unit 104 and any other component (e.g. the signal level driver 206 as shown in FIG. 2). The Communicator_Class declares an indexed database (i.e. m_database) for storing queues of transactions. Each queue belongs to a communication pair of source component or the FSM and destination component or the FSM. The one or more functions of the communicator class are described as follows. The one or more functions of communicator class to represent the communication between two FSMs as well as between any FSM and any component are defined and implemented. The one or more functions of the communicator class includes (i) a connect function to connect a source FSM/component to a destination FSM/component by adding them to list of all source-destination pairs of FSMs/components that are valid in the indexed database, (ii) a do_reset function to clear all queues in the indexed database, (iii) a put function or a try_put function to push, into the database, the transaction from the source FSM/component to the destination FSM/component in blocking or non-blocking manner, (iv) a get function or a try_get function to retrieve, from the database, the transaction for the destination FSM/component from the source FSM/component in blocking or non-blocking manner, (v) a get_any function or a try_get_any function to retrieve, from the database, the transaction for the destination FSM/component from any connected source FSM/component in blocking or non-blocking manner, (vi) a broadcast function to broadcast, from the database, the transaction for all the connected destination FSMs/components from a particular source FSM/component, (vii) a clear_incoming function to clear all incoming transactions to the particular destination FSM/component from the database, (viii) a clear_outgoing function to clear all transactions outgoing from a particular source FSM/component from the database, (ix) a detect_pending_sources function to return a list of all source FSMs/components with at least one transaction that is pending and to be transmitted to a particular connected destination FSM/component and (x) a size function to return a number of pending transactions in the queue of transactions stored in the indexed database for a particular pair of source FSM/component and destination FSM/component.

Figure 7:
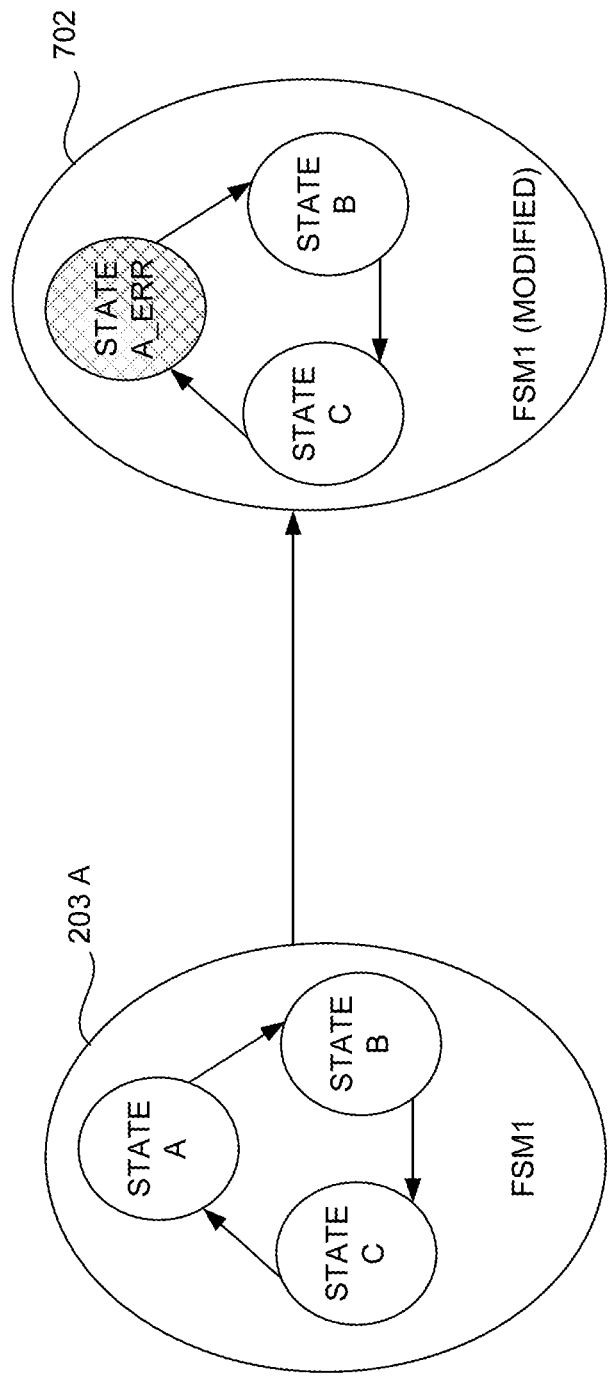
FIG. 7 illustrates an exemplary method of modifying a functionality of a FSM according to an embodiment herein.

FIG. 7 illustrates an exemplary method of modifying a functionality of a FSM according to an embodiment herein. The method of modifying an existing functionality of a FSM includes the step of (a) extending a targeted State Class and (b) defining a new State_Class with a modified do action task in accordance with an intended erroneous functionality. In one embodiment, an original State_Class is overridden with the new State_Class to achieve the intended erroneous functionality. In an example embodiment, the method of modifying the functionalities of a FSM1 203A includes the step (i) extending a new STATE A_err of the modified FSM1 702 from STATE A of FSM1 203A, and (ii) overriding STATE A of FSM1 203A with STATE A_err to obtain a modified FSM1 702.

Figure 8:
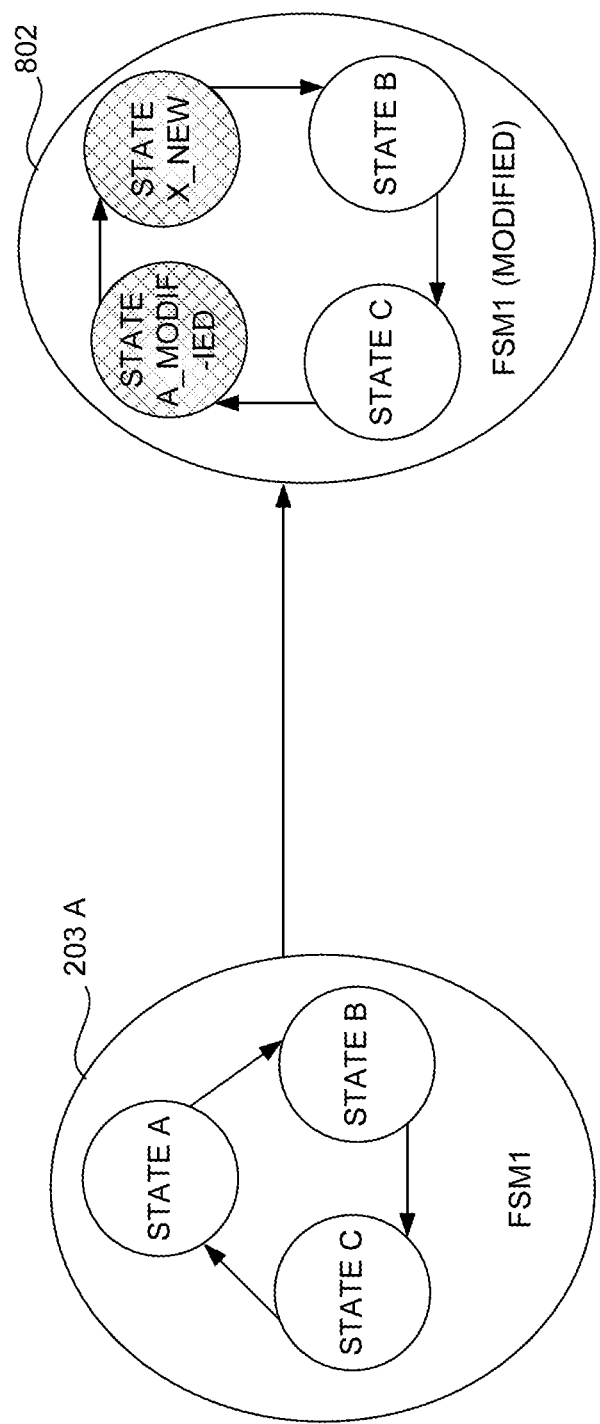
FIG. 8 illustrates an exemplary method of adding a new functionality of a FSM according to an embodiment herein.

FIG. 8 illustrates an exemplary method of adding a new functionality of a FSM according to an embodiment herein. The method of adding additional/new functionality to a FSM includes the step of (a) extending the state class to define a modified state class with a modified functionality that is directed to a new state class with the additional functionality to be added, (b) over-riding the state class with the modified state class and (c) defining and adding the new state class with the next state class. In an example embodiment, the method of adding the additional functionality to a FSM1 203A includes the step of (a) adding a new state, STATE X_NEW with a desired additional/new functionality (b) overriding STATE A of the FSM1 203A with STATE A_MODIFIED, which points to STATE X_new as the next state to obtain a modified FSM1 802. The modified FSM1 802 includes the modified next_state task of STATE A_MODIFIED to STATE X_NEW) and adds a new state STATE X_NEW with next state task to STATE B.

Figure 9:
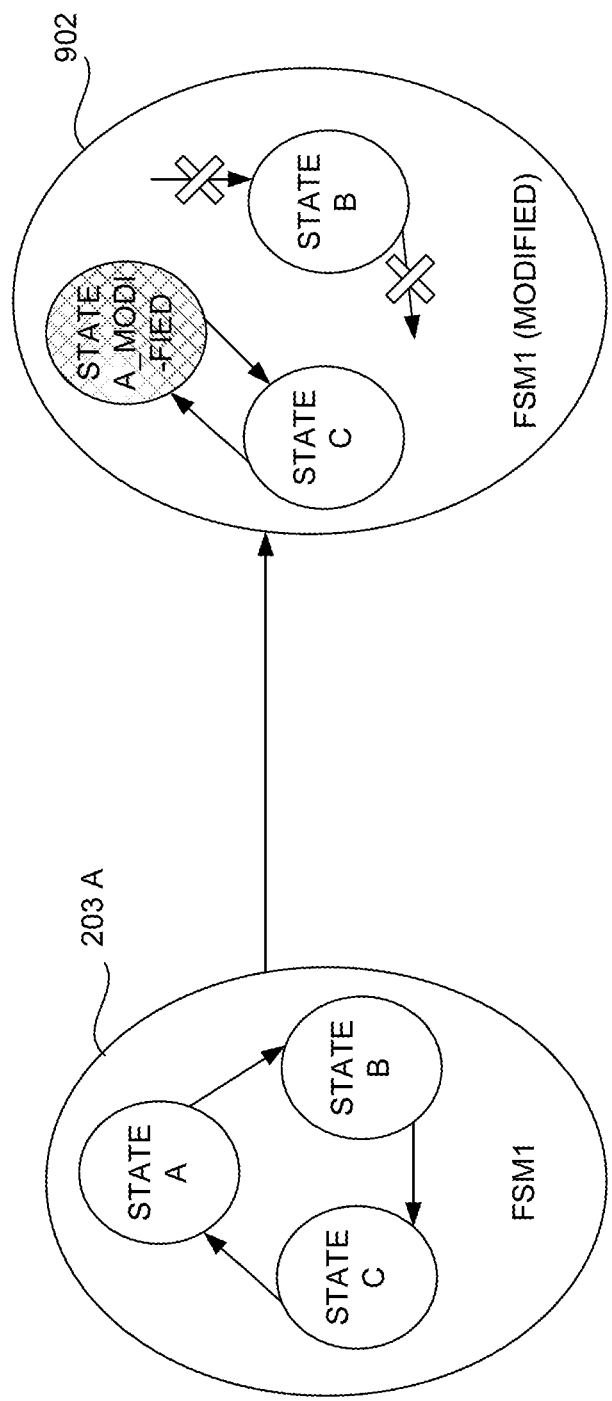
FIG. 9 illustrates an exemplary method of removing an existing functionality of a FSM according to an embodiment herein.

FIG. 9 illustrates an exemplary method of removing an existing functionality of a FSM according to an embodiment herein. The method of removing an existing functionality of the FSM includes the step of (a) extending the state class to define a modified state class with a modified functionality that is directed to a next state class after skipping a state class including the functionality to be removed and (b) over-riding the state class with the modified state class. In an example embodiment, the method of removing an existing functionality of a FSM1 203A includes the step of (a) removing the STATE B during execution of the FSM1 203A by overriding STATE A of FSM1 203A with STATE A_MODIFIED to obtain a modified FSM1 902. The modified FSM1 902 includes the modified next state task of STATE A_MODIFIED to STATE C.

Figure 10:
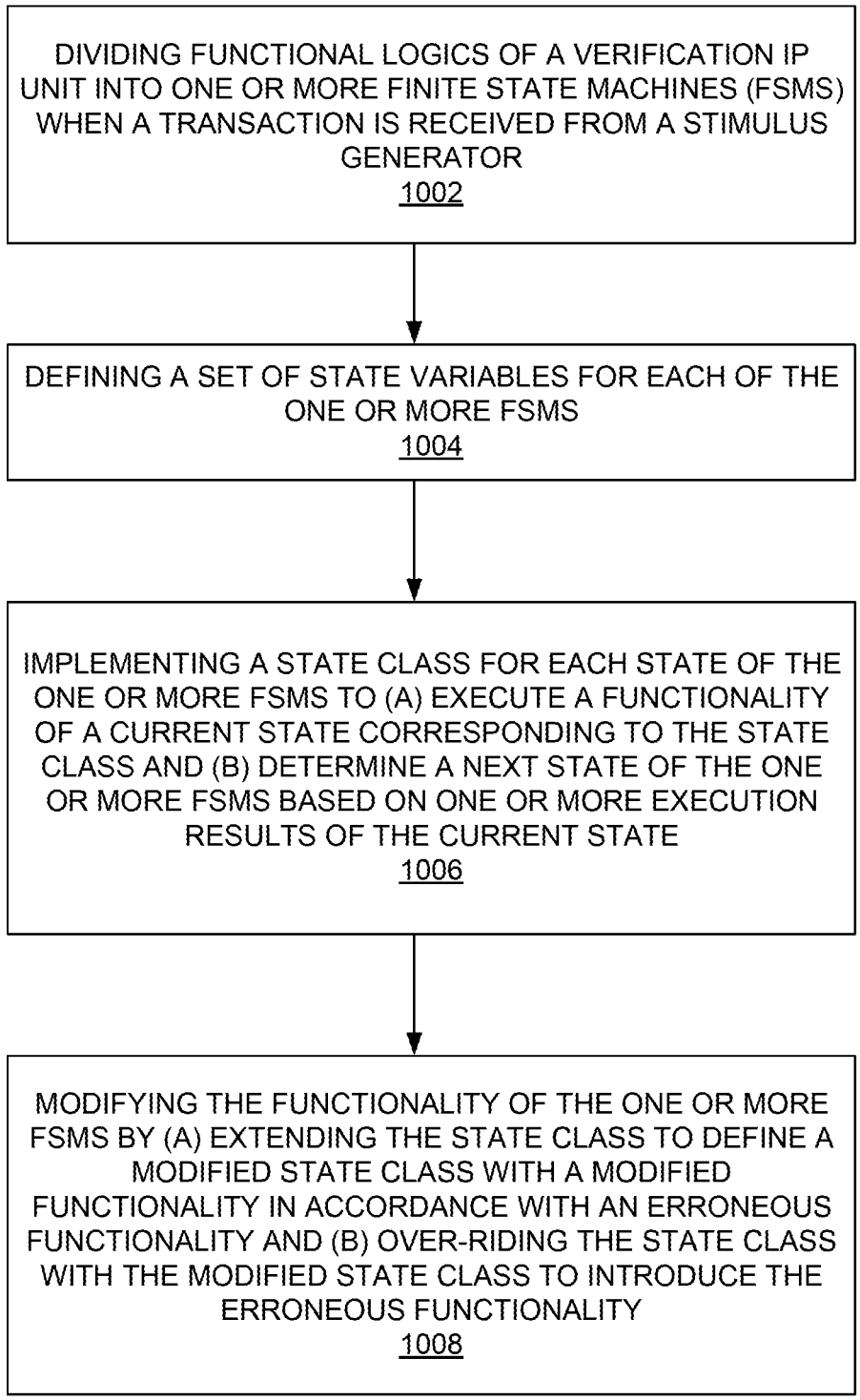
FIG. 10 is a flowchart that illustrates a method of implementing functional logics of the verification IP unit 104 using a transaction level modeling (TLM) according to an embodiment herein.

FIG. 10 is a flowchart that illustrates a method of implementing functional logics of the verification IP unit 104 using a transaction level modeling (TLM) according to an embodiment herein. At step 1002, functional logics of a verification IP unit is divided into one or more finite state machines (FSMs) 203A-C when a transaction is received from a stimulus generator. At step 1004, a set of state variables 204A-C for each of the one or more FSMs 203A-C is defined. In one embodiment, defining the set of state variables 204A-C for each of the one or more FSMs 203A-C includes (i) defining a state variable base class for determining the set of state variables 204A-C for the one or more FSMs 203A-C and (ii) defining the set of state variables that are specific to the one or more FSMs 203A-C by extending the state variable base class. The set of state variables 204A-C are encapsulated in a class. At step 1006, a state class for each state of the one or more FSMs 203A-C is implemented to (i) execute a functionality of a current state corresponding to the state class and (ii) determine a next state of the one or more FSMs 203A-C based on one or more execution results of the current state. In one embodiment, each state of the one or more FSMs 203A-C is represented as the state class. In one embodiment, the implementing the state class for each state of the one or more FSMs 203A-C includes (i) providing a state interface to expose the functionalities of the state class, (ii) defining a state base class for the baseline functionalities of the state class, (iii) implementing the state class of the one or more FSMs 203A-C by extending the state class from the state base class and (iv) implementing a decision logic to determine a next state class.

At step 1008, the functionality of the one or more FSMs 203A-C is modified by (i) extending the state class to define a modified state class with a modified functionality in accordance with an erroneous functionality, and (ii) over-riding the state class with the modified state class to introduce the erroneous functionality.

In one embodiment, the method further includes adding an additional functionality to the one or more FSMs 203A-C by (i) extending the state class to define a modified state class with a modified functionality that is directed to a new state class with the additional functionality to be added, (ii) over-riding the state class with the modified state class and (iii) defining and adding the new state class with the next state class.

In another embodiment, the method further includes removing a functionality of the one or more FSMs 203A-C by (i) extending the state class to define a modified state class with a modified functionality that is directed to a next state class after skipping a state class comprising the functionality to be removed, and (ii) over-riding the state class with the modified state class.

Figure 11:
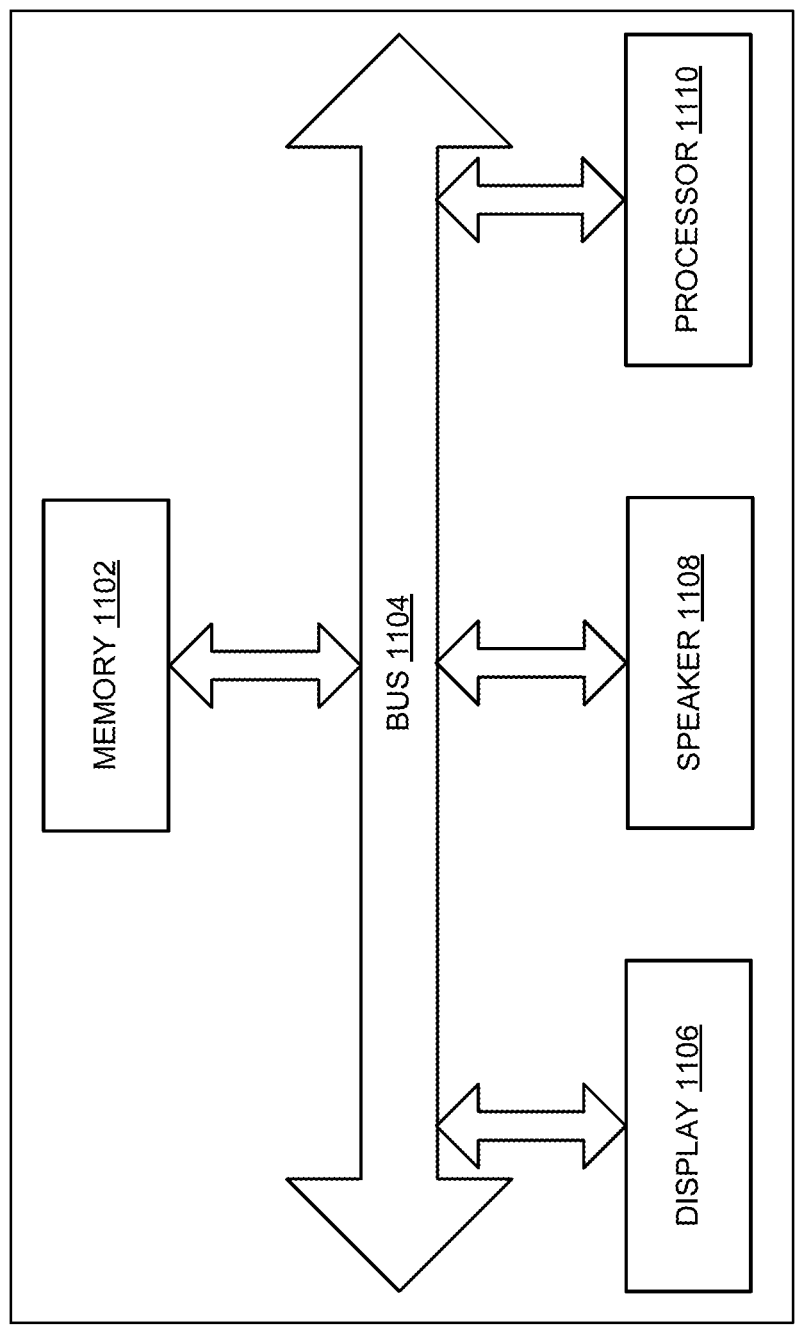
FIG. 11 illustrates an exploded view of a receiver according to the embodiments herein.

FIG. 11 illustrates an exploded view 1100 of a receiver having a memory 1102 having a set of computer instructions, a bus 1104, a display 1106, a speaker 1108, and a processor 1110 capable of processing a set of instructions to perform any one or more of the methodologies herein, according to an embodiment herein. The processor 1110 may also enable digital content to be consumed in the form of video for output via one or more displays 1106 or audio for output via speaker and/or earphones 1108. The processor 1110 may also carry out the methods described herein and in accordance with the embodiments herein.

Digital content may also be stored in the memory 1102 for future processing or consumption. The memory 1102 may also store program specific information and/or service information (PSI/SI), including information about digital content (e.g., the detected information bits) available in the future or stored from the past. A user of the personal communication device may view this stored information on display 1106 and select an item of for viewing, listening, or other uses via input, which may take the form of keypad, scroll, or other input device(s) or combinations thereof. When digital content is selected, the processor 1110 may pass information. The content and PSI/SI may be passed among functions within the personal communication device using the bus 1104.

The design under test verified by the techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The design under test verified by the embodiments herein can take the form of, an entirely hardware embodiment, an entirely software embodiment or an embodiment including both hardware and software elements. The design under test verified by the embodiments that are implemented in software include but are not limited to, firmware, resident software, microcode, etc. Furthermore, the design under test verified by the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 12:
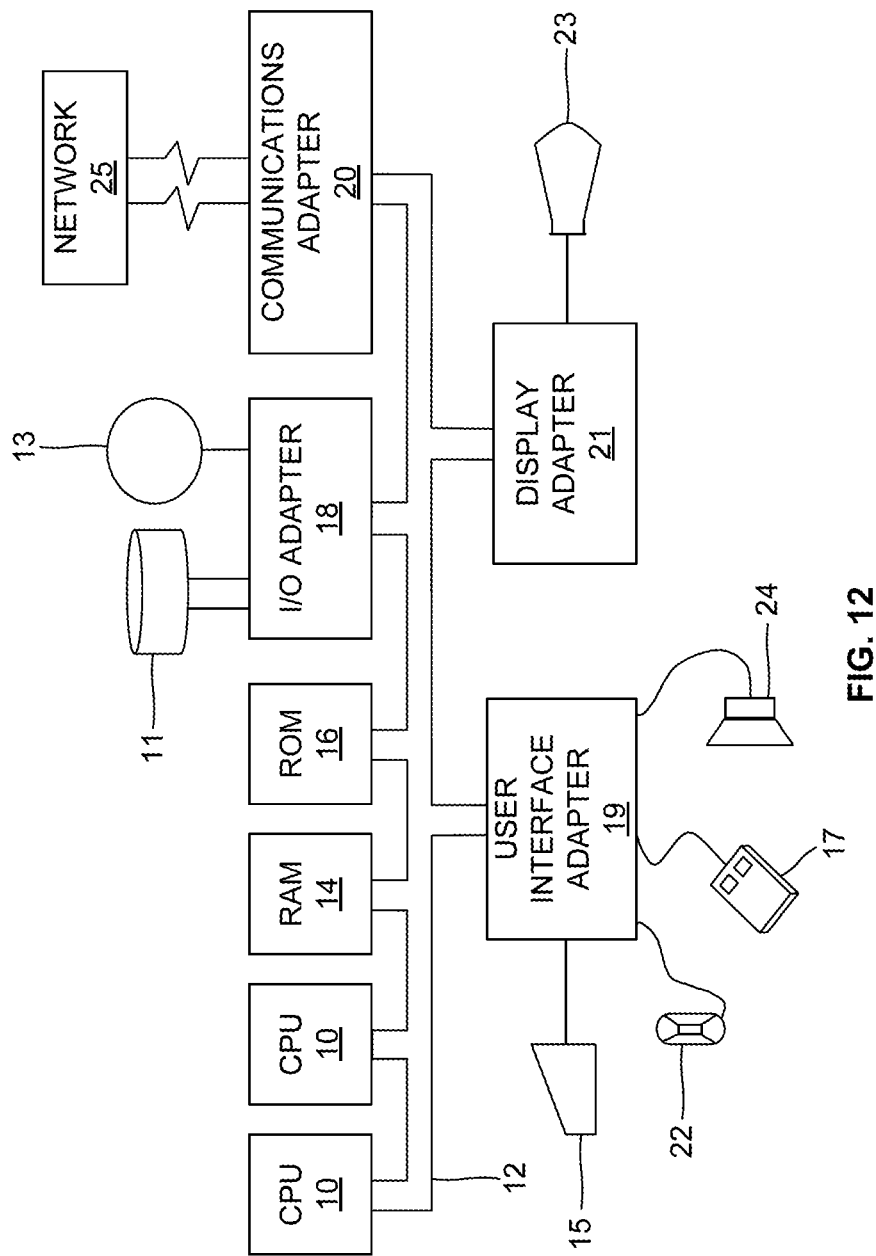
FIG. 12 illustrates a schematic diagram of computer architecture of a user device or a server, in accordance with the embodiments herein.

A representative hardware environment for practicing the embodiments herein is depicted in FIG. 12. This schematic drawing illustrates a hardware configuration of a computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A method for implementing functional logics of a verification intellectual property (VIP) using state design pattern based finite state machines (FSMs) communicating with each other thus implementing the functionality, comprising:

dividing functional logics of a VIP unit into one or more finite state machines that receive transaction from a stimulus generator;

defining a set of state variables for each of the one or more FSMs;

implementing a state class for each state of the one or more FSMs to (a) execute a functionality of a current state corresponding to the state class and (b) determine a next state of the one or more FSMs based on one or more execution results of the current state, wherein each state of the one or more FSMs is represented as the state class; and modifying the functionality of the one or more FSMs by
(a) extending the state class of at least one state of the each state to define a modified state class with a modified functionality in accordance with an erroneous functionality, and
(b) over-riding the state class of at least one state of the each state with the modified state class to introduce the erroneous functionality.

2. The method as claimed in claim 1, further comprising adding an additional functionality to the one or more FSMs by
(a) extending the state class of at least one state of the each state to define a modified state class with a modified functionality that is directed to a new state class with the additional functionality to be added;
(b) over-riding the state class of at least one state of the each state with the modified state class and
(c) defining and adding the new state class with the next state class.

3. The method as claimed in claim 1, further comprising removing a functionality of the one or more FSMs by
(a) extending the state class of at least one state of the each state to define a modified state class with a modified functionality that is directed to a next state class after skipping a state class comprising the functionality to be removed, and
(b) over-riding the state class of at least one state of the each state with the modified state class.

4. The method as claimed in claim 1, wherein the defining the set of state variables for each of the one or more FSMs comprises
defining a state variable base class for determining the set of state variables for the one or more FSMs, wherein the set of state variables are encapsulated in a class; and
defining the set of state variables that are specific to the one or more FSMs by extending the state variable base class.

5. The method as claimed in claim 1, wherein the implementing the state class for each state of the one or more FSMs comprises
providing a state interface to expose the functionalities of the state class for the each state;

defining a state base class for the baseline functionalities of the state class for the each state;

implementing the state class for the each state of the one or more FSMs by extending the state class for the each state from the state base class; and implementing a decision logic inside state class to determine a next state class.

6. The method as claimed in claim 1, wherein the execution of the functionality of the state class comprises:

(a) switching ON the one or more FSMs by
   identifying an initial state class of the one or more FSMs,
   executing the functionalities of the initial state class, and
   determining a first next state class of the one or more FSMs;

(b) running the one or more FSMs by
   identifying the next state class as a new state class,
   executing the functionalities of the new state class, and
   determining a second next state class of the one or more FSMs; and (c) switching OFF the one or more FSMs by terminating the execution of the state class.

7. The method as claimed in claim 6, further comprising:

(a) resetting the one or more FSMs by switching OFF the one or more FSMs and switching ON the one or more FSMs;

(b) suspending execution of the one or more FSMs at a current state class on generation of an interrupt;

(c) resuming the execution of the one or more FSMs from the current state class; and (d) interrupting the execution of the one or more FSMs on generation of the interrupt.

8. The method as claimed in claim 7, further comprising:
defining an interrupt service routine (ISR) state of the interrupt resulting in (a) suspending the execution of the one or more FSMs and resuming after executing the ISR state, and (b) interrupting the execution of the one or more FSMs and returning to the initial state class of the one or more FSMs after executing the ISR state.

9. The method as claimed in claim 6, further comprising:
transmitting the transaction to another FSM; and
receiving the transaction from another FSM.

10. The method as claimed in claim 1, wherein the method further comprises the step of providing a communication interface for transmitting the transaction from at least one of (a) a source FSM to a destination FSM, (b) the stimulus generator to the one or more FSMs, (c) the one or more FSMs to a signal level driver and (d) a source component to a destination component.

11. The method as claimed in claim 10, wherein the method further comprises:
connecting the source FSM or component to the destination FSM/component through a database that comprises transaction level queues;
resetting the transaction level queues in the database;
storing, in the database, a transaction from the source FSM/component to the destination FSM/component;
retrieving, from the database, a transaction for the destination FSM/component from any connected source FSM/component;
broadcasting, from the database, a transaction for all the connected destination FSMs/components from the source FSM/component; and
removing, from the database, at least one of (a) all transactions pending to be received by the destination FSM/component, and (b) all transactions transmitted by the source FSM/component.

12. The method as claimed in claim 11, wherein the method further comprises:
retrieving a list of source FSMs/components with transaction pending to be transmitted to a connected destination FSM/component; and
retrieving a number of pending transactions in the transaction level queue for a particular pair of the source FSM/component and the destination FSM/component.

13. A verification system, comprising:
a stimulus generator that is configured to initiate a transaction and transmit the transaction through a transaction level model interface;
a verification intellectual property (VIP) unit that is configured to receive and process the transaction, wherein the functional logics of the VIP unit is divided into one or more finite state machines (FSMs), wherein the one or more FSMs is configured to
define a set of state variables for each of the one or more FSMs;
implement a state class for each state of the one or more FSMs to execute a functionality of a current state corresponding to the state class and to determine a next state of the one or more FSMs based on one or more execution results of the current state, wherein each state of the one or more FSMs is represented as the state class;
modify the functionality of the one or more FSMs by (a) extending the state class of at least one state of the each state to define a modified state class with a modified functionality in accordance with an erroneous functionality, and (b) over-riding the state class of at least one state of the each state with the modified state class to introduce the erroneous functionality for error testing of a design under test; and
a signal-level driver that is configured to toggle pins of the design under test (DUT) based on the processed transaction.

14. The verification system as claimed in claim 13, wherein the one or more FSMs is further configured to add an additional functionality to the one or more FSMs by (a) extending the state class of at least one state of the each state to define a modified state class with a modified functionality that is directed to a new state class with the additional functionality to be added, (b) over-riding the state class of at least one state of the each state with the modified state class, and (c) defining and adding the new state class with the next state class.

15. The verification system as claimed in claim 13, wherein the one or more FSMs is further configured to remove a functionality of the one or more FSMs by (a) extending the state class of at least one state of the each state to define a modified state class with a modified functionality that is directed to a next state class after skipping a state class comprising the functionality to be removed, and (b) over-riding the state class of at least one state of the each state with the modified state class.

* * * * *